Aug. 3, 1937.  C. M. LEJUSTE  2,088,709
MOTOR VEHICLE
Filed Sept. 7, 1935
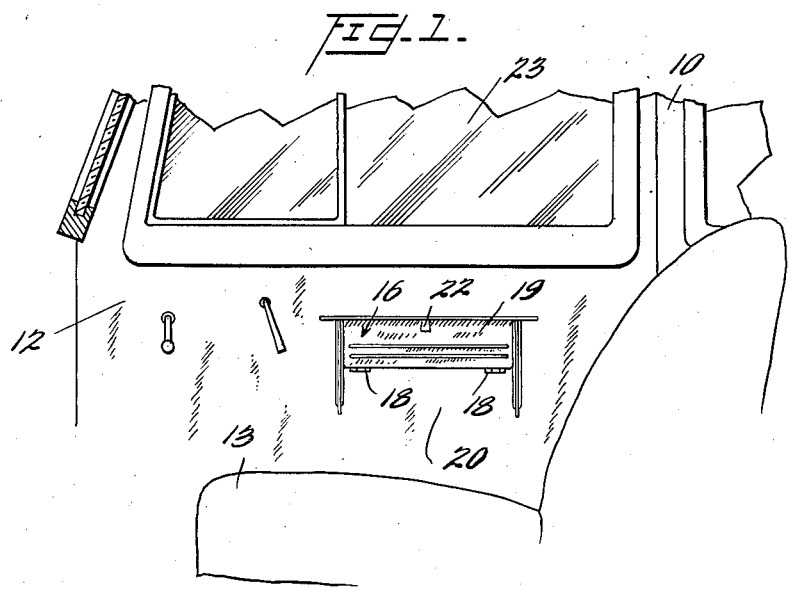
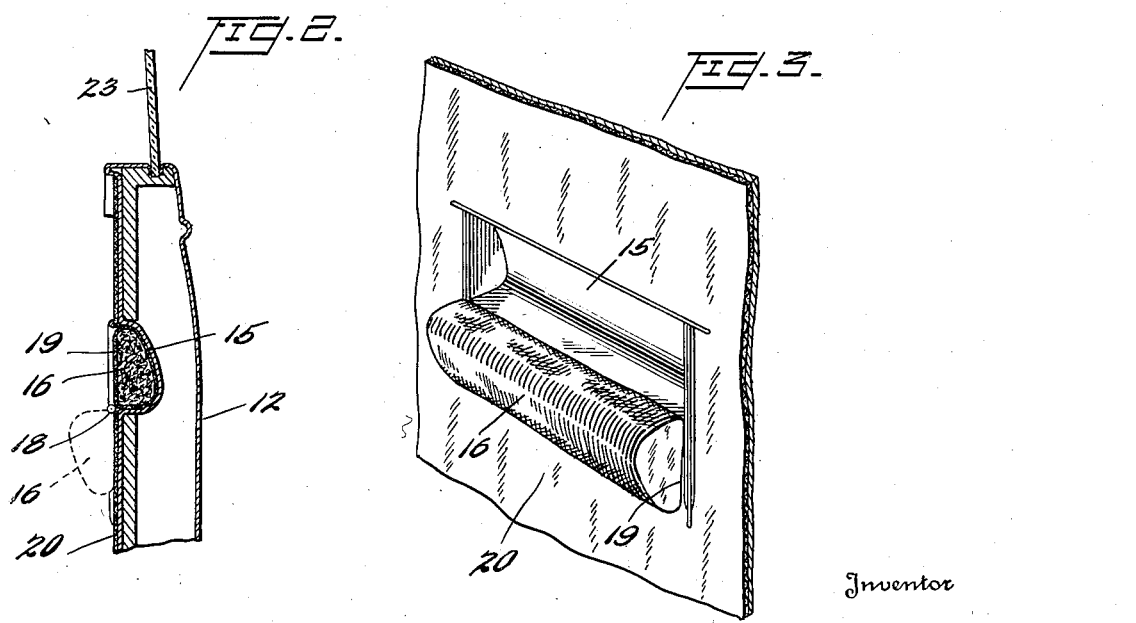
Inventor
Charles M. Lejuste
By Watson, Coit, Morse & Grindle
Attorney Patented Aug. 3, 1937

2,088,709

UNITED STATES PATENT OFFICE 2,088,709

MOTOR VEHICLE

Charles M. Lejuste, Detroit, Mich., assignor to Packard Motor Car Company, Detroit, Mich., a corporation of Michigan Application September 7, 1935, Serial No. 39,618

1 Claim. (Cl. 296—44)

This invention relates to motor vehicle bodies and is more particularly concerned with the seating accommodations provided for passengers. It is the principal object of the invention to provide an arm rest adjacent a vehicle seat which will be available when required but which may be readily displaced from its operative position when its use is not desired.

More specifically it is an object of the invention to provide an arm rest in a motor vehicle body which is permanently supported by the body and which may be displaced from an operative position alongside a seat of the vehicle into a recess in the body. In the preferred form of the invention the arm rest, which is of the conventional, generally elongated shape, is hingedly connected to a side panel of the body structure for swinging movement about a generally horizontal axis and the body panel is recessed immediately above the point of support for the arm rest so that the latter may be swung into the recess. The contour of the arm rest may be such that when it is received in the panel structure it lies substantially flush with the inner face of the panel structure so as to nearly disappear.

The arrangement described herein is obviously superior to the more conventional detachable arm rests since the present rest may be readily disposed of when not wanted and yet cannot be misplaced. Permanent and rigid arm rests are frequently undesirable, particularly in vehicles having seats which are designed to accommodate at times an excess number of passengers, the rest taking up a portion of the space which might well be used to afford greater comfort to the passengers.

Further objects and features of the invention will be apparent from the following description taken in connection with the accompanying drawing, in which Figure 1 is a side elevational view of the interior of a motor vehicle body illustrating one embodiment of the present invention;

Figure 2 is a vertical sectional view through a side panel of the body shown in Figure 1 and illustrating the positions assumed by the arm rest when operative and inoperative; and Figure 3 is a perspective view of the panel shown in Figure 2 illustrating the operative position of the arm rest.

In the accompanying drawing the invention has been shown as applied to the forward compartment of a motor vehicle, the arm rest being associated with the vehicle door which, when closed, is ordinarily disposed alongside the front seat of the vehicle. An arm rest of this character is particularly useful in association with a front seat since in most motor vehicles the front seat is not as wide as the rear seat and it is sometimes desired to accommodate three passengers rather than two on the front seat, in which event the maximum amount of space measured laterally of the vehicle must be available if the passengers are to be comfortable and if the vehicle is to be operated without interference with the driver's freedom of movement. It will nevertheless be understood that in its broader aspect the invention is applicable to rear vehicle seats and that the arm rest shown herein may be applied to any side panel structure adjacent a seat.

Referring more specifically to the drawing, it will be observed that in Figure 1 the vehicle body, indicated generally at 10, is illustrated as provided with a door 12, the latter being hingedly connected to the body in the conventional manner and constituting a side panel of the body structure. A seat 13 extends laterally of the vehicle and is disposed adjacent the door 12.

The door is recessed as indicated at 15 and receives in the recess, with a more or less snug fit, an arm rest 16 which is of generally elongated shape. The arm rest 16 is hingedly connected as at 18 to the door, preferably immediately below the recess 15, and is provided with a generally flat face 19 which may engage with the inner face 20 of the door when swung downwardly to operative position, as shown in Figure 3 and in dotted lines in Figure 2, and which may be generally flush with the inner face 20 of the door when swung into inoperative position in the recess 15. Preferably the face 19 of the arm rest and the inner face 20 of the door are similarly upholstered so that when the arm rest is in the inoperative position it harmonizes with the door structure and appears on casual inspection to be a part thereof. A tab 22, a finger hold, or other conveniently grasped member may be associated with the face 19 of the arm rest to facilitate withdrawal of the rest from the recess 15 in the door. If desired, means may be provided to yieldingly retain the arm rest in the operative position, but such means may ordinarily be dispensed with if the arm rest fits snugly within the recess 15, the retention of the arm rest being effected by frictional engagement between the rest and the door recess. Similarly in the lowered or operative position the arm rest will ordinarily require no special means to prevent unintentional displacement, the rest depending from its hinged connection with the door and being retained in operative position by gravity.

It will be noted that when the arm rest 16 is in its lowered or operative position, the recess 15 affords additional space for the arm of the passenger and it is therefore possible to provide an arm rest of less thickness as measured laterally than would ordinarily be necessary for comfortable support of the arm.

The door 12 is shown as provided with a window 23 which is illustrated for convenience as immovably supported in the door. It will nevertheless be appreciated that the invention contemplates the application of an arm rest to doors having conventional forms of displaceable window, it being a simple matter to design the window operating mechanism and the guides for the window to avoid interference with the arm rest and the door recess in which it is received.

Various other alterations and modifications of the arrangement shown herein are contemplated such as fall within the spirit and scope of the appended claim.

Having thus described the invention, what is claimed as new and desired to be secured by Letters Patent is:

In a motor vehicle, the combination with a vehicle panel having an elongated, generally horizontally extending recess in the inner face thereof, and an arm rest hingedly supported on said panel at the lower side of said recess, said arm rest being dimensioned for reception in said recess, whereby said arm rest may be swung into an inoperative position within said recess or into an operative position adjacent the inner face of the panel, said arm rest having a generally flat surface for engagement with the inner face of the panel when the arm rest is in the operative position, said flat surface being substantially flush with the inner face of the panel when the arm rest is swung into said recess.

CHARLES M. LEJUSTE.